United States Patent
Yang et al.

(10) Patent No.: US 10,242,168 B2
(45) Date of Patent: Mar. 26, 2019

(54) METHODS AND APPARATUSES FOR CONTROLLING SMART DEVICE

(71) Applicant: XIAOMI INC., Beijing (CN)

(72) Inventors: Yun Yang, Beijing (CN); Enxing Hou, Beijing (CN); Min He, Beijing (CN)

(73) Assignee: XIAOMI INC., Beijing (CN)

( * ) Notice: Subject to any disclaimer, the term of this patent is extended or adjusted under 35 U.S.C. 154(b) by 119 days.

(21) Appl. No.: 15/393,562

(22) Filed: Dec. 29, 2016

(65) Prior Publication Data

US 2017/0185757 A1 Jun. 29, 2017

(30) Foreign Application Priority Data

Dec. 29, 2015 (CN) .......................... 2015 1 1018100

(51) Int. Cl.
| | | |
|---|---|---|
| G06F 21/00 | (2013.01) | |
| G06F 21/31 | (2013.01) | |
| H04L 12/28 | (2006.01) | |
| H04M 1/725 | (2006.01) | |
| G08C 17/02 | (2006.01) | |
| G08C 23/04 | (2006.01) | |
| G06F 3/0484 | (2013.01) | |

(52) U.S. Cl.
CPC ............ *G06F 21/31* (2013.01); *G08C 17/02* (2013.01); *G08C 23/04* (2013.01); *H04L 12/2814* (2013.01); *H04M 1/72533* (2013.01); *G06F 3/0484* (2013.01); *G08C 2201/30* (2013.01); *G08C 2201/93* (2013.01)

(58) Field of Classification Search
CPC ... G06F 1/163; G06F 3/038; G06F 2203/0331
See application file for complete search history.

(56) References Cited

U.S. PATENT DOCUMENTS

| | | | |
|---|---|---|---|
| 7,477,950 B2 | 1/2009 | DeBourke et al. | |
| 7,756,590 B2 | 7/2010 | DeBourke et al. | |

(Continued)

FOREIGN PATENT DOCUMENTS

| | | |
|---|---|---|
| CA | 2509019 A1 | 10/2005 |
| CN | 101261515 A | 10/2008 |

(Continued)

OTHER PUBLICATIONS

International Search Report issued in corresponding PCT Application No. PCT/CN2016/097255, dated Dec. 29, 2015, 5 pages.

(Continued)

*Primary Examiner* — Ghazal B Shehni
(74) *Attorney, Agent, or Firm* — Arch & Lake LLP

(57) ABSTRACT

Methods and apparatuses are provided for controlling a smart device in the field of Human-Computer Interaction. The method includes: displaying an interface for controlling a system; acquiring an interface for controlling a smart device upon detection of an instruction for controlling the smart device inputted from a user based on the interface for controlling the system, the instruction for controlling the smart device carrying an identifier of the smart device, and the instruction for controlling the smart device being configured to trigger the acquiring of the interface for controlling the smart device; and displaying the interface for controlling the smart device.

15 Claims, 13 Drawing Sheets

(56) References Cited

U.S. PATENT DOCUMENTS

| | | | |
|---|---|---|---|
| 7,770,205 B2 | 8/2010 | Frank | |
| 2006/0069453 A1 | 3/2006 | DeBourke et al. | |
| 2008/0221714 A1 | 11/2008 | Schoettle | |
| 2009/0118871 A1 | 5/2009 | DeBourke et al. | |
| 2015/0236908 A1* | 8/2015 | Kim | H04L 41/0816 709/221 |
| 2016/0132031 A1* | 5/2016 | Kozura | H04L 12/2816 700/275 |
| 2017/0019520 A1 | 1/2017 | Wang et al. | |
| 2017/0031640 A1 | 2/2017 | Fu et al. | |

FOREIGN PATENT DOCUMENTS

| | | |
|---|---|---|
| CN | 103023681 A | 4/2013 |
| CN | 103399548 A | 11/2013 |
| CN | 104468837 A | 3/2015 |
| CN | 104503688 A | 4/2015 |
| CN | 104615004 A | 5/2015 |
| CN | 104915094 A | 9/2015 |
| CN | 105045120 A | 11/2015 |
| CN | 105068467 A | 11/2015 |
| CN | 105093949 A | 11/2015 |
| CN | 105100213 A | 11/2015 |
| CN | 105159523 A | 12/2015 |
| CN | 105652672 A | 6/2016 |
| EP | 3119040 A1 | 1/2017 |
| EP | 3128417 A1 | 2/2017 |

OTHER PUBLICATIONS

First Office Action issued in corresponding Chinese Patent Application No. 201511018100.8 dated Feb. 24, 2018, 9 pages.

Extended European Search Report issued in corresponding EP Application No. 16207186.4, dated May 17, 2017, 7 pages.

International Search Report issued in corresponding PCT/CN2016/097255, dated Nov. 29, 2016, 6 pages.

Chinese Office Action (including English translation) issued in corresponding CN Patent Application No. 201511018100.8, dated Nov. 9, 2018, 27 pages.

* cited by examiner

METHODS AND APPARATUSES FOR CONTROLLING SMART DEVICE

CROSS-REFERENCE TO RELATED APPLICATION

This application is based upon and claims priority to Chinese Patent Application 201511018100.8, filed on Dec. 29, 2015, the entire contents of which are incorporated herein by reference.

TECHNICAL FIELD

The present disclosure generally relates to the field of terminal technology, and more particularly, to a method and an apparatus for controlling a smart device.

BACKGROUND

A smart home application (APP) is a client software integrating functions such as smart device accessing, binding, controlling, or the like. A user may check operating states of home smart devices and control the smart devices using the APP. Herein, the smart device refers to some hardware devices with built-in wireless communication chips such as Wi-Fi, Bluetooth, Zigbee, or the like. The smart device may access a network (e.g., the Internet) and communicate with the user's terminal. The smart device, for example, may be a Wi-Fi smart camera, a Wi-Fi smart socket or the like. With the smart home APP, the user establishes a one-to-one correspondence relationship between an identifier of each smart device and a currently used account for logging in the smart home APP at a server side, thereby forming a binding relationship between the device and the user, and thus the user is authorized to control each smart device by the binding relationship. However, currently, the user has to download a smart home application from an APP store to the terminal to realize control operations on the smart devices, which is relatively complex.

SUMMARY

Embodiments of the present disclosure provide a method and an apparatus for controlling a smart device. The technical solution is as below.

According to a first aspect of the present disclosure, there is provided a method for controlling a smart device. The method includes: displaying a first interface for controlling a system including a terminal device and the smart device; acquiring a second interface for controlling the smart device upon detection of an instruction for controlling the smart device inputted from a user based on the first interface for controlling the system, the instruction for controlling the target smart device carrying an identifier of the target smart device, and the instruction for controlling the target smart device being configured to trigger the acquiring of the second interface for controlling the target smart device; and displaying the second interface for controlling the target smart device.

According to a second aspect of the present disclosure, there is provided an apparatus for controlling a smart device, including: a processor; and a memory for storing instructions executable by the processor. The processor is configured to perform: displaying an interface for controlling a system; acquiring an interface for controlling a target smart device upon detection of an instruction for controlling the target smart device inputted from a user based on the interface for controlling the system, the instruction for controlling the target smart device carrying an identifier of the target smart device, and the instruction for controlling the target smart device being configured to trigger the acquiring of the interface for controlling the target smart device; and displaying the interface for controlling the target smart device.

According to a third aspect of the present disclosure, there is provided an non-transitory computer-readable storage medium storing instructions, executable by a processor to perform a method for controlling a smart device, including: displaying an interface for controlling a system; acquiring an interface for controlling a target smart device upon detection of an instruction for controlling the target smart device inputted from a user based on the interface for controlling the system, the instruction for controlling the target smart device carrying an identifier of the target smart device, and the instruction for controlling the target smart device being configured to trigger the acquiring of the interface for controlling the target smart device; and displaying the interface for controlling the target smart device.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

With the above accompanying drawings, specific embodiments of the present disclosure have been illustrated, which will be described in more detail. The accompanying drawings and the textual description are not intended to limit the scope of the concept of the present disclosure in any way, rather, they are provided to explain the concept of the present disclosure to those skilled in the art by referring to particular embodiments.

DETAILED DESCRIPTION

The present disclosure provides methods and apparatuses for controlling a smart home system, which may include a terminal and a smart device. The terminal may have an operating system that integrates multiple control interfaces into the operating system. A user can activate a first control interface to view and control one or more smart devices by clicking on an icon directly on the system interface without downloading additional application software. The apparatus can display the first control interface to list the one or more smart devices according to user preferences. When one of the smart devices is selected, the apparatus can display a device-specific control interface for the selected smart device. The system interface may further include an icon or menu to activate a logging control interface, through which the user can add additional smart devices to the smart home system.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
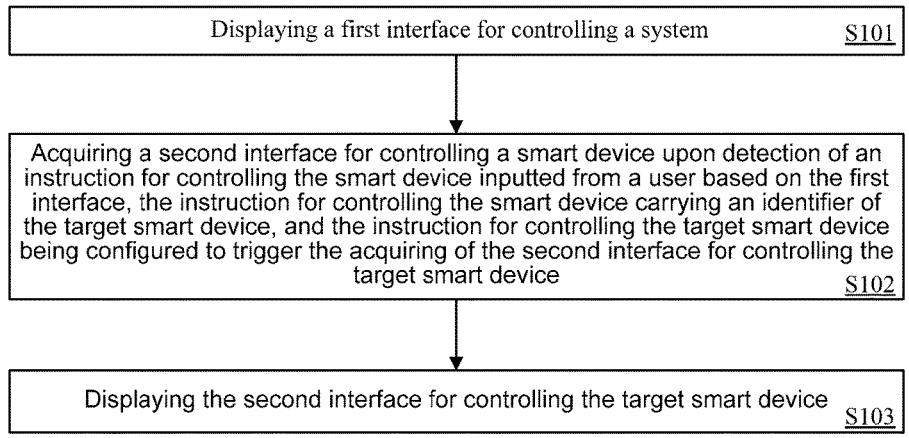
FIG. 1 is a flow chart showing a method for controlling a smart device, according to an exemplary embodiment.

FIG. 1 is the flow chart of a method for controlling a smart device, according to an exemplary embodiment. As illustrated in FIG. 1, the present embodiment is described in an example in which the method for controlling the smart device is applied in a terminal. The method for controlling the smart device may include the following steps.

In step S101, a first interface for controlling the system is displayed. For example, the terminal may display the first interface for controlling the system that includes the terminal and the smart device.

In step S102, a second interface for controlling a smart device is acquired upon detection of an instruction for controlling the smart device inputted from a user based on the interface for controlling the system. The instruction for controlling the smart device carries an identifier of the smart device, and the instruction for controlling the smart device is configured to trigger the acquiring of the second interface for controlling the smart device.

In step S103, the second interface for controlling the target smart device is displayed.

In the present embodiment, the interface for controlling the system is displayed on the display interface of the terminal. The user may input the instruction for controlling the target smart device through the interface for controlling the system. When the terminal detects the instruction for controlling the target smart device, the interface for controlling the target smart device is acquired and then displayed, and in turn the user may control the target smart device based on the interface for controlling the target smart device.

To sum up, according to the method for controlling the smart device of the present embodiment, upon detection of the instruction for controlling the target smart device inputted from the user based on the interface for controlling the system, the interface for controlling the target smart device is acquired and then displayed, such that the user may control the target smart device based on the interface for controlling the target smart device, thereby the user may access the interface for controlling the target smart device through the interface for controlling the system and manage the target smart device. Accordingly, the present disclosure may solve the problem that although smart devices can be managed according to the related art, the user has to download an application for managing the smart devices and the operation is relatively complex, thereby achieving an effect of simplifying user operation.

Figure 2A:
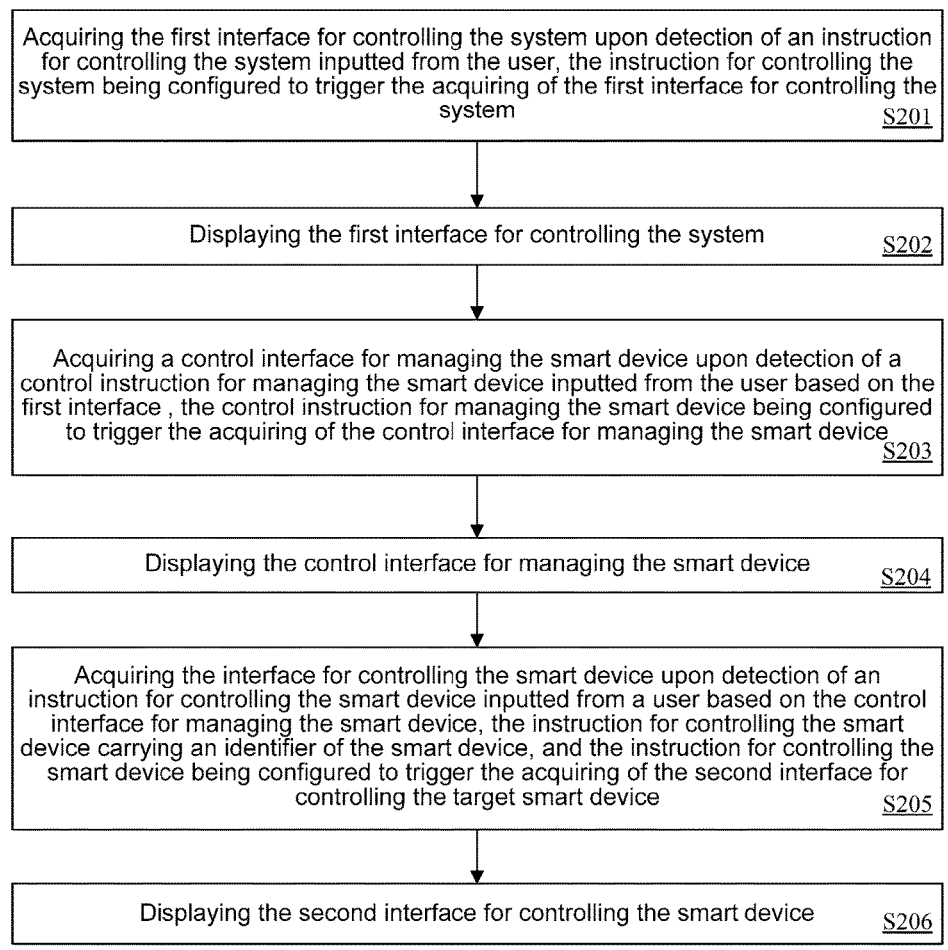
FIG. 2A is a flow chart showing a method for controlling a smart device, according to another exemplary embodiment.

FIG. 2A is a flow chart illustrating a method for controlling a smart device according to another exemplary embodiment. As illustrated in FIG. 2A, the present embodiment is described in an example in which the method for controlling the smart device is applied in a terminal. The method for controlling the smart device may include the following steps.

In step S201, the first interface for controlling the system is acquired upon detection of an instruction for controlling the system inputted from the user. The instruction for controlling the system is configured to trigger the acquiring of the first interface for controlling the system.

In step S202, the first interface for controlling the system is displayed.

Figure 2B:
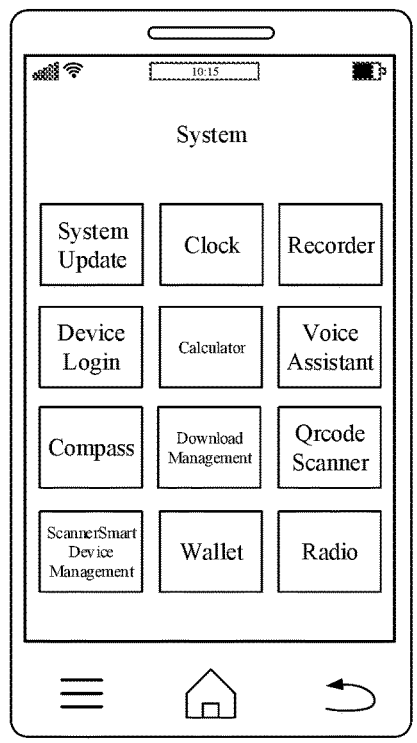
FIG. 2B is a schematic diagram illustrating an interface for controlling a system, according to another exemplary embodiment.

In the present embodiment, the terminal may detect the instruction for controlling the system inputted from the user by a touch screen or a physical button of the terminal, wherein the instruction for controlling the system is configured to trigger the acquiring of the interface for controlling the system of the terminal. In one embodiment, the instruction for controlling the system inputted from the user by the touch screen of the terminal may be, for example, a tap on an icon of the system displayed on the display interface of the terminal performed by the user on the touch screen of the terminal; and the instruction for controlling the system inputted from the user by the physical button of the terminal may be, for example, a selection of an icon of the system displayed on the display interface of the terminal performed by the user using the physical button. Afterwards, the terminal acquires the interface for controlling the system according to the detected instruction for controlling the system, and then displays the interface for controlling the system on the display interface of the terminal, as illustrated in FIG. 2B. It should be noted that, the schematic diagram of the interface for controlling the system illustrated in FIG. 2B is only an example, and embodiments of the present disclosure are not limited thereto. That is, the interface for controlling the system of the embodiment of the present disclosure is not limited to that illustrated in FIG. 2B.

In step S203, a control interface for managing the smart device is acquired upon detection of a control instruction for managing the smart device inputted from the user based on the interface for controlling the system. The control instruction for managing the smart device is configured to trigger the acquiring of the control interface for managing the smart device.

Figure 2C:
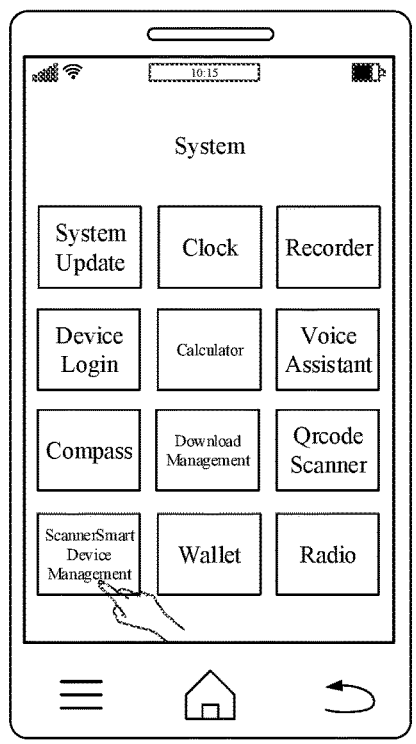
FIG. 2C is a schematic diagram illustrating an operation for controlling a smart device, according to another exemplary embodiment.

In the present embodiment, the terminal may detect the control instruction for managing the smart device inputted from the user based on the interface for controlling the system, where the control instruction for managing the smart device is configured to trigger the acquiring of the control interface for managing the smart device of the system. In one embodiment, the control interface of managing the smart device may be entered from the interface for controlling the system. For example, in the case where an icon of Smart Device Management is displayed on the interface for controlling the system and the terminal is a terminal having a touch screen, the user may tap the icon of Smart Device Management displayed on the interface for controlling the system based on the interface for controlling the system, such that the terminal may detect the control instruction for managing the smart device inputted from the user by the touch screen and the interface for controlling the system, as illustrated in FIG. 2C. It should be noted that, the icon of Smart Device Management is not limited to that illustrated in FIG. 2C.

In step S204, the control interface for managing the smart device is displayed.

Figure 2D:
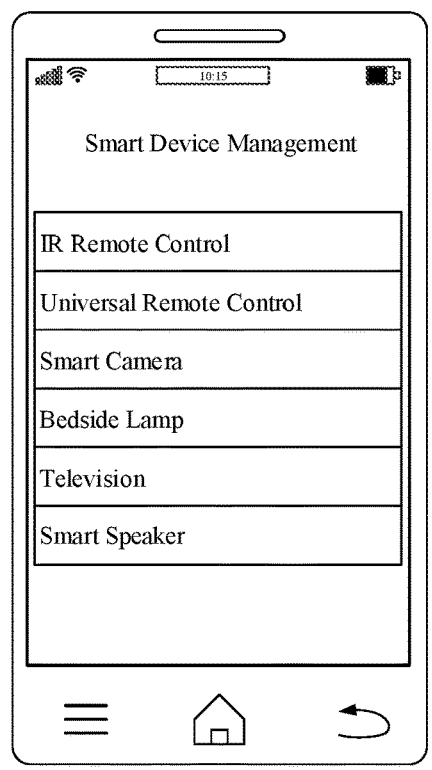
FIG. 2D is a schematic diagram illustrating a control interface for managing a smart device, according to another exemplary embodiment.

In the present embodiment, the terminal may display the control interface for managing the smart device on the display interface, as illustrated in FIG. 2D. At this time, the display interface of the terminal changes from the interface for controlling the system into the control interface for managing the smart device. It should be noted that, the schematic diagram of the control interface for managing the smart device illustrated in FIG. 2D is only an example, and embodiments of the present disclosure are not limited thereto. That is, the control interface for managing the smart device of embodiments of the present disclosure is not limited to that illustrated in FIG. 2D.

In FIG. 2D, the control interface may list multiple smart devices according to user preferences. For example, the control interface may list multiple smart devices according to the nick names or other identifiers of the smart devices. Additionally or alternatively, the control interface may list multiple smart devices by grouping the smart devices into sub-groups according to their functions, manufacturers, working statuses, or locations, etc. For example, the working statuses may include active, standby, sleep, powered off, etc. The locations may include living room, kitchen, first bedroom, second bedroom, etc.

In step S205, the interface for controlling the smart device is acquired upon detection of the instruction for controlling the smart device inputted from the user based on the control interface for managing the smart device. The instruction for controlling the smart device carries an identifier of the smart device, and the instruction for controlling the smart device is configured to trigger the acquiring of the interface for controlling the smart device.

Figure 2E:
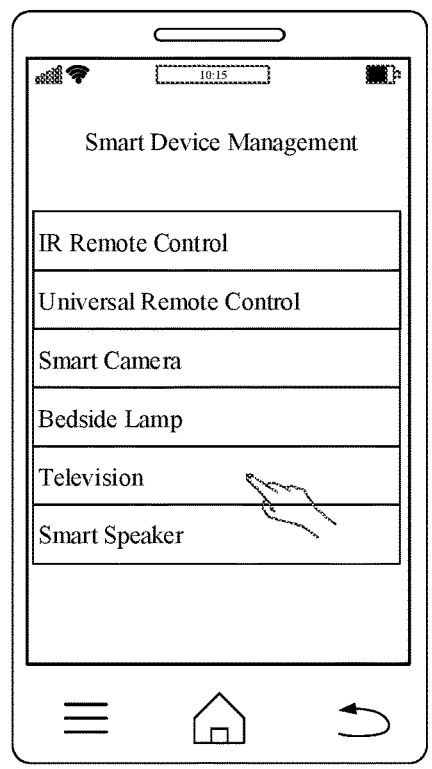
FIG. 2E is a schematic diagram illustrating an operation for controlling a smart device, according to another exemplary embodiment.

In the disclosure, the terminal may detect the instruction for controlling the target smart device inputted from the user based on the control interface for managing the smart device. The instruction for controlling the target smart device is configured to trigger the acquiring of the interface for controlling the target smart device of the smart device management. In one embodiment, the interface for controlling the target smart device is entered from the control interface for managing the smart device. For example, in the case where icons of each smart device are displayed on the control interface for managing the smart device and the terminal is a terminal having a touch screen, the user may tap the icon of the target smart device displayed on the control interface for managing the smart device based on the control interface for managing the smart device, such that the terminal may detect the instruction for controlling the target smart device inputted from the user by the touch screen and the control interface for managing the smart device, as illustrated in FIG. 2E. The target smart device may be a television, for example. It should be noted that, the icon of the television of embodiments of the present disclosure is not limited to that illustrated in FIG. 2E.

In step S206, the second interface for controlling the smart device is displayed.

Figure 2F:
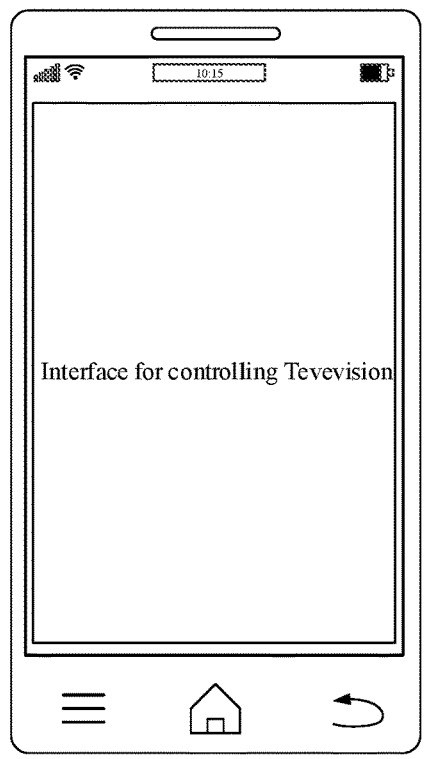
FIG. 2F is a schematic diagram illustrating a control interface for managing a target smart device, according to another exemplary embodiment.

For example, the terminal may display the second interface for controlling a target smart device on the display interface of the terminal. At this time, the second display interface of the terminal changes from the control interface for managing the smart device to the interface for controlling the target smart device, as illustrated in FIG. 2F. Afterwards, the user may control the target smart device based on the second interface for controlling the target smart device. The example in FIG. 2F illustrate a device-specific control interface for controlling a smart TV. However, other device-specific control interfaces may be displayed when a different smart device is selected.

Alternatively, in another optional implementation of steps S205 and S206, the above instruction for controlling the target smart device may carry identifiers of a plurality of target smart devices, and the instruction for controlling the target smart device is configured to trigger the acquiring of the interfaces for controlling the plurality of target smart devices. In the present embodiment, interfaces for controlling the plurality of target smart devices are acquired, and the interfaces for controlling the plurality of smart devices are displayed in a splitview. The splitview provides multiple control interfaces on the same display screen so that the user may control the plurality of smart devices conveniently. At least one of the control interface may include a background image or watermark correspond to the corresponding smart device. For example, the control interface for controlling a smart TV may have a background image showing the TV set, a control interface for controlling a smart switch may have a background image showing the smart switch.

Figure 2G:
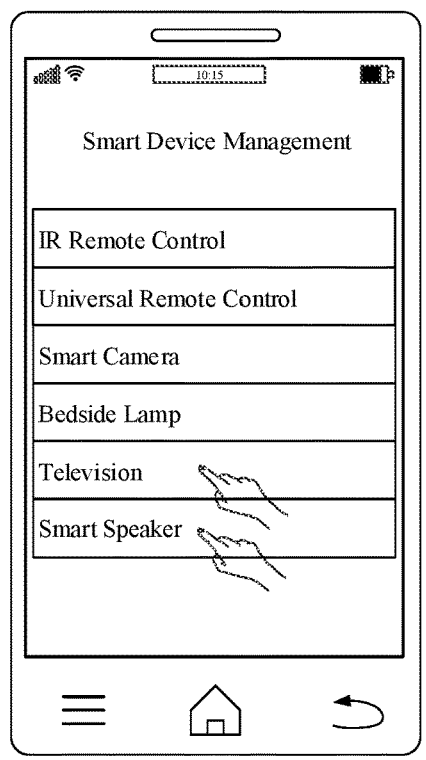
FIG. 2G is a schematic diagram illustrating an operation for controlling a smart device, according to another exemplary embodiment.
Figure 2H:
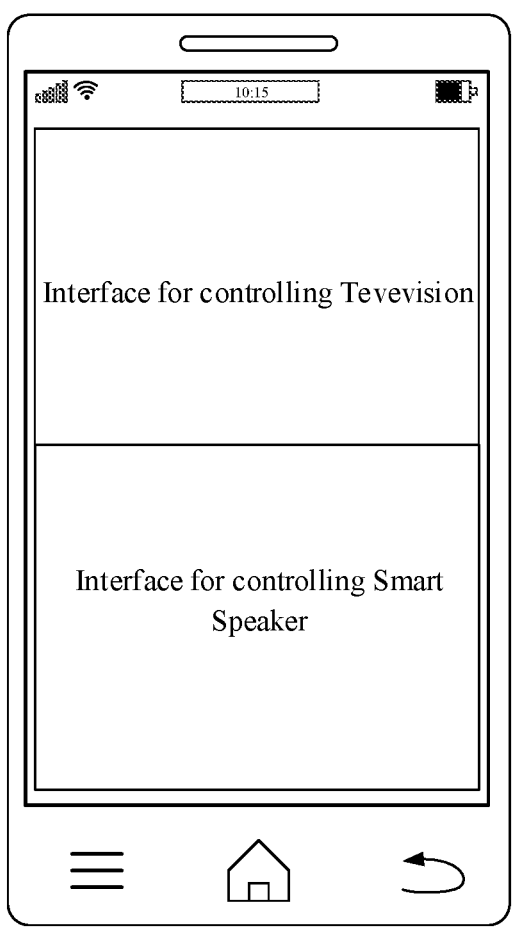
FIG. 2H is a schematic diagram illustrating a control interface for managing a target smart device, according to another exemplary embodiment.

For example, as illustrated in FIG. 2G, the plurality of target smart devices includes a television and a smart speaker, and the user may tap the icon of the television and the icon of the smart speaker displayed on the control interface for managing the smart device based on the control interface for managing the smart device. Then, an interface for controlling the television and an interface for controlling the smart speaker are displayed in a splitview, as illustrated in FIG. 2H. It should be noted that, a manner of the splitview is not limited to that illustrated in FIG. 2H. The terminal may automatically adjust the brightness or other feature in one of the views in the splitview when the corresponding smart device is turned on or otherwise activated.

To sum up, according to the method for controlling the smart device of the present embodiment, the interface for controlling the system is displayed upon detection of the instruction for controlling the system inputted from the user, then the control interface for managing the smart device is displayed upon detection of the control instruction for managing the smart device inputted from the user based on the interface for controlling the system, and then the interface for controlling the target smart device is displayed upon detection of the instruction for controlling the target smart device inputted from the user based on the control interface for managing the smart device, such that the user may enter the interface for controlling the target smart device from the interface for controlling the system and the control interface for managing the smart device successively, and then control the target smart device. Accordingly, the present disclosure may solve the problem that although smart devices can be managed according to the related art, the user has to download an application for managing the smart devices and the operation is relatively complex, thereby achieving an effect of simplifying user operation.

Figure 3A:
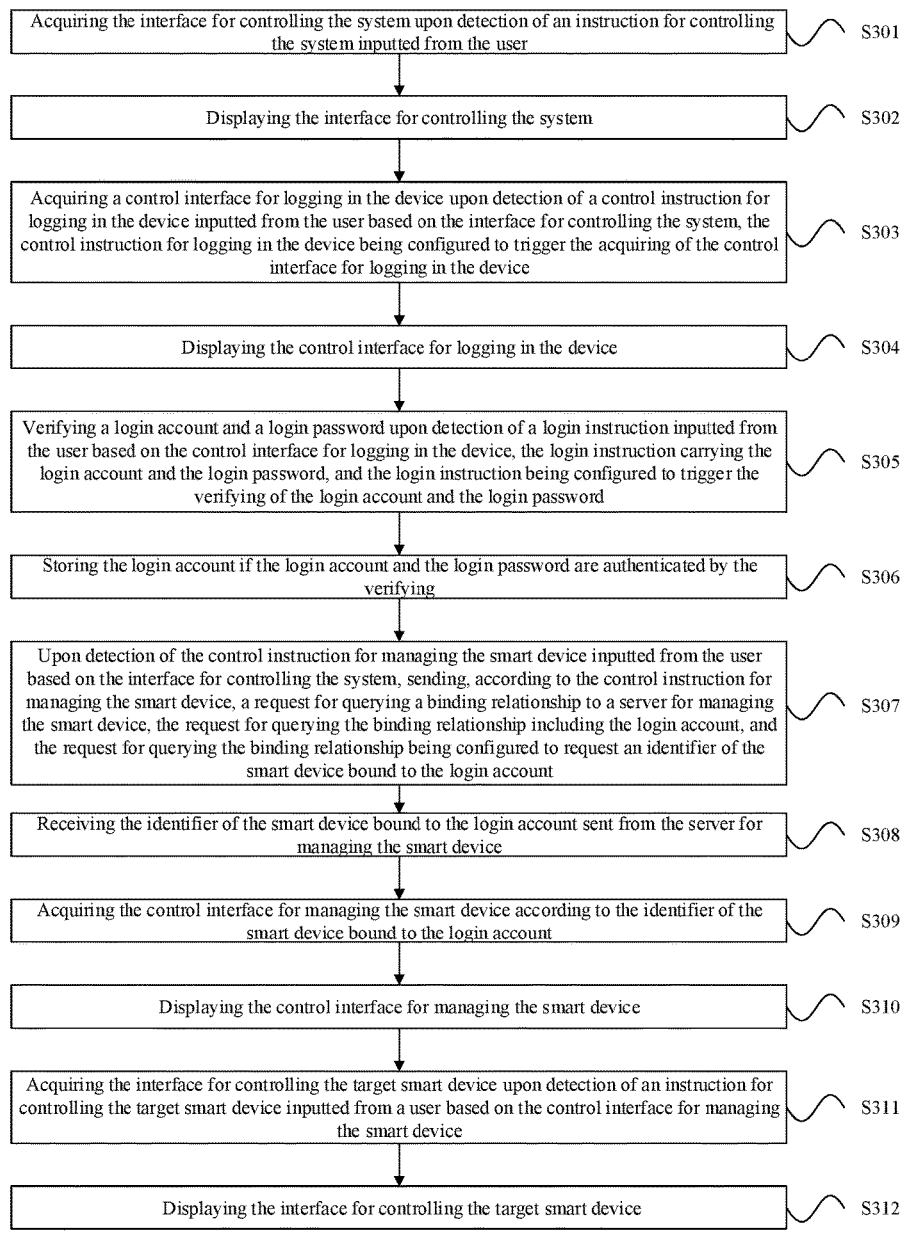
FIG. 3A is a flow chart showing a method for controlling a smart device, according to another exemplary embodiment.

FIG. 3A is a flow chart illustrating a method for controlling a smart device according to another exemplary embodiment. As illustrated in FIG. 3A, the present embodiment is described in an example in which the method for controlling the smart device is applied in a terminal. The method for controlling the smart device may include the following steps.

In step S301, the interface for controlling the system is acquired upon detection of the instruction for controlling the system inputted from the user.

In step S302, the interface for controlling the system is displayed.

In the present embodiment, the implementation of the steps S301-S302 may refer to corresponding description in the embodiment illustrated in FIG. 2A, which will not be elaborated herein.

In step S303, a logging interface for logging in the device is acquired upon detection of a control instruction for logging in the device inputted from the user based on the interface for controlling the system. The control instruction for logging in the device is configured to trigger the acquiring of the logging interface for logging in the device.

Figure 3B:
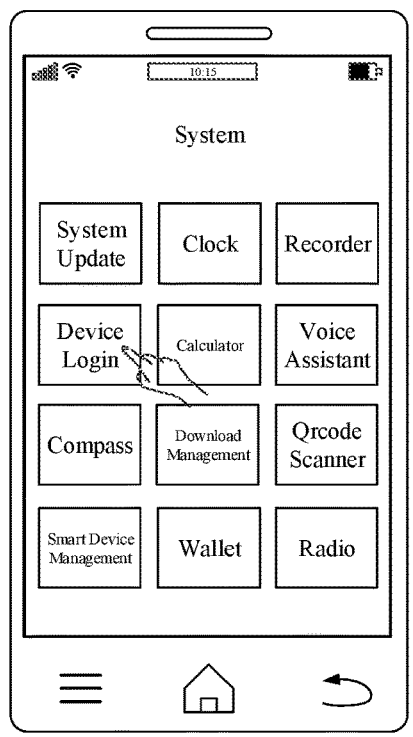
FIG. 3B is a schematic diagram illustrating an operation for controlling a smart device, according to another exemplary embodiment.

In the present embodiment, the terminal may detect the control instruction for logging in the device inputted from the user based on the interface for controlling the system, herein the control instruction for logging in the device is configured to trigger the acquiring of the logging interface for logging in the device. The interface for controlling the system includes an icon of Login Device, as illustrated in FIG. 2B. Taking a terminal having a touch screen for example, the user may tab the icon of Login Device displayed on the interface for controlling the system based on the interface for controlling the system, such that the terminal may detect the control instruction for logging in the device inputted from the user by the touch screen and the interface for controlling the system, as illustrated in FIG. 3B. It should be noted that, the icon of Login Device is not limited to that illustrated in FIG. 3B.

In step S304, the logging interface for logging in the device is displayed.

Figure 3C:
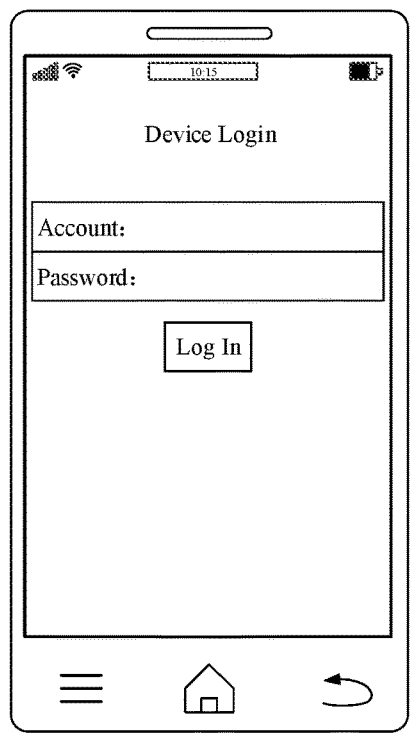
FIG. 3C is a schematic diagram illustrating a logging interface for logging in a device, according to another exemplary embodiment.

In the present embodiment, the terminal may display the logging interface for logging in the device on the display interface, as illustrated in FIG. 3C. At this time, the display interface of the terminal changes from the interface for controlling the system to the logging interface for logging in the device.

In step S305, a login account and a login password are verified upon detection of a login instruction inputted from the user based on the logging interface for logging in the device. The login instruction carries the login account and the login password, and the login instruction is configured to trigger the verifying of the login account and the login password.

In step S306, the login account is stored if the login account and the login password are authenticated by the verifying.

In the present embodiment, the user may input the login account and the login password of the user through the logging interface for logging in the device and click the Login icon, and then the terminal may detect the login account and the login password inputted from the user. Afterwards, the terminal may verify the login account and the login password, and the login account may be stored if the login account and the login password are authenticated by the verifying, and thus the user may log in using the login account.

In step S307, upon detection of the control instruction for managing the smart device inputted from the user based on the interface for controlling the system, a request for querying a binding relationship is sent to a server for managing the smart device according to the control instruction for managing the smart device. The request for querying the binding relationship includes the login account, and the request for querying the binding relationship is configured to request an identifier of the smart device bound to the login account.

In step S308, the identifier of the smart device bound to the login account sent from the server for managing the smart device is received.

In the present embodiment, after the terminal detects the control instruction for managing the smart device, since the user has logged in using the above login account, the terminal may send the request for querying the binding relationship to the server for managing the smart device according to the control instruction for managing the smart device. The querying of the binding relationship includes the above login account, where the request for querying the binding relationship is configured to request for the identifier of the smart device bound to the login account. The binding relationship between the login account and the identifier of the smart device is stored in the server for managing the smart device, and thus the server for managing the smart device sends the identifier of the smart device bound to the login account to the terminal according to the request for querying the binding relationship.

In step S309, the control interface for managing the smart device is acquired according to the identifier of the smart device bound to the login account.

In step S310, the control interface for managing the smart device is displayed.

In the present embodiment, after the terminal receives the identifier of the smart device bound to the login account sent from the server for managing the smart device, the control interface for managing the smart device is acquired according to the identifier of the smart device bound to the login account, and then the control interface for managing the smart device is displayed on the display interface of the terminal. Icons of the smart devices bound to the login account are displayed on the control interface for managing the smart device, as illustrated in FIG. 2E. The smart device bound to the login account includes an infrared (IR) remote control, a universal remote control, a smart camera, a bedside lamp, a television, and a smart speaker. Accordingly, the user may control the smart device bound to the login account through the control interface for managing the smart device.

In step S311, the interface for controlling the target smart device is acquired upon detection of the instruction for controlling the target smart device inputted from the user based on the control interface for managing the smart device.

In step S312, the interface for controlling the target smart device is displayed.

In the present embodiment, the implementation of the steps S311-S312 may refer to corresponding description in the embodiment illustrated in FIG. 2A, which will not be elaborated herein.

To sum up, according to the method for controlling the smart device of the present embodiment, the interface for controlling the system is displayed upon detection of the instruction for controlling the system inputted from the user, then the control interface for managing the smart device is displayed upon detection of the control instruction for managing the smart device inputted from the user based on the interface for controlling the system, and then the interface for controlling the target smart device is displayed upon detection of the instruction for controlling the target smart device inputted from the user based on the control interface for managing the smart device, such that the user may enter the interface for controlling the target smart device from the interface for controlling the system and the control interface for managing the smart device successively, and then control the target smart device. Accordingly, the present disclosure may solve the problem that although smart devices can be managed according to the related art, the user has to download an application for managing the smart devices and the operation is relatively complex, thereby achieving an effect of simplifying user operation.

Figure 4A:
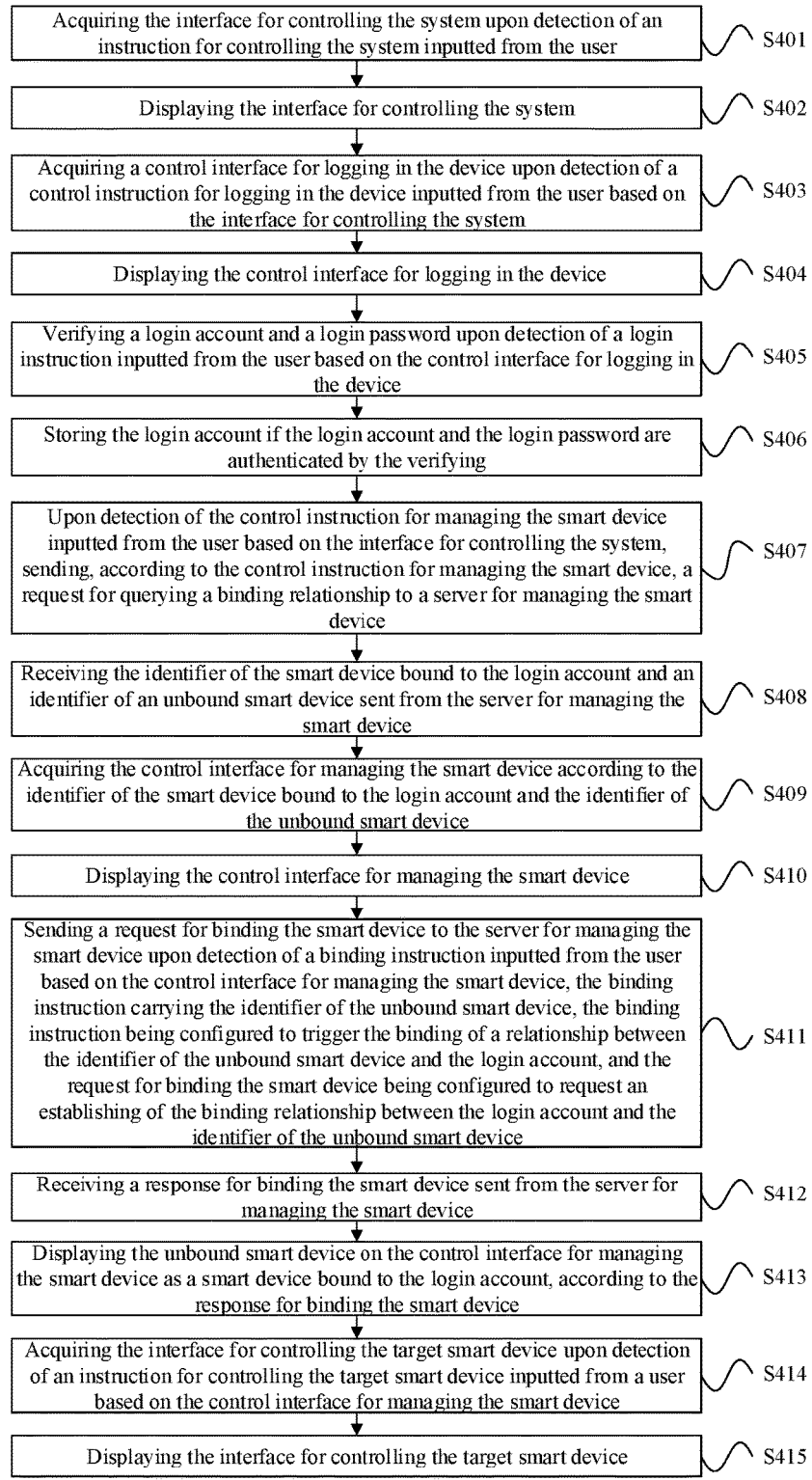
FIG. 4A is a flow chart showing a method for controlling a smart device, according to another exemplary embodiment.

FIG. 4A is a flow chart illustrating a method for controlling a smart device according to another exemplary embodiment. As illustrated in FIG. 4A, the present embodiment is described in an example in which the method for controlling the smart device is applied in a terminal. The method for controlling the smart device may include the following steps.

In step S401, the interface for controlling the system is acquired upon detection of the instruction for controlling the system inputted from the user.

In step S402, the interface for controlling the system is displayed.

In step S403, the logging interface for logging in the device is acquired upon detection of the control instruction for logging in the device inputted from the user based on the interface for controlling the system.

In step S404, the logging interface for logging in the device is displayed.

In step S405, the login account and the login password are verified upon detection of the login instruction inputted from the user based on the logging interface for logging in the device.

In step S406, the login account is stored if the login account and the login password are authenticated by the verifying.

In step S407, when it is detected that the user has input the control instruction for managing the smart device based on the interface for controlling the system, the request for querying the binding relation is sent to the server for managing the smart device according to the control instruction for managing the smart device.

In the present embodiment, the implementation of the steps S401-S407 may refer to corresponding description in the embodiment illustrated in FIG. 3A, which will not be elaborated herein.

In step S408, the identifier of the smart device bound to the login account and the identifier of the unbound smart device sent from the server for managing the smart device are received.

In the present embodiment, binding relationship between the login account and the identifier of the smart device is stored in the server for managing the smart device, and thus the server for managing the smart device sends the identifier of the smart device bound to the login account to the terminal according to the request for querying the binding relationship. Information regarding the smart device that is not bound to any login account, e.g., the local area network in which the smart device is located, is also stored in the server for managing the smart device, and thus the server for managing the smart device may also send the identifier of the unbound smart device (i.e., the smart device that is not bound to any login account) that is in the same local area network with the terminal to the terminal.

In step S409, the control interface for managing the smart device is acquired according to the identifier of the smart device bound to the login account and the identifier of the unbound smart device.

In step S410, the control interface for managing the smart device is displayed.

Figure 4B:
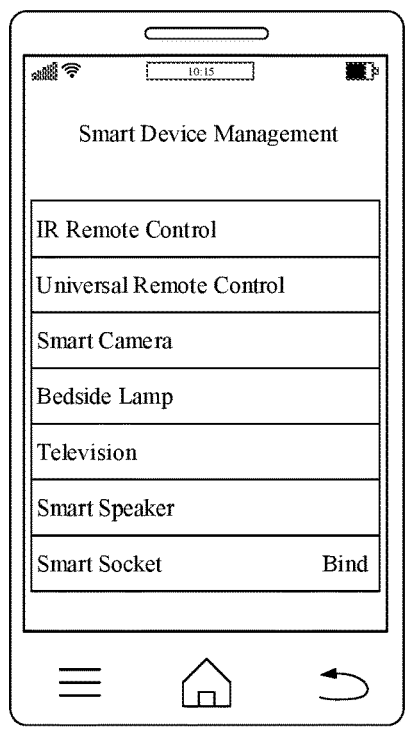
FIG. 4B is a schematic diagram illustrating a control interface for managing a smart device, according to another exemplary embodiment.

In the present embodiment, after the terminal receives the identifier of the smart device bound to the login account and the identifier of the unbound smart device sent from the server for managing the smart device, the control interface for managing the smart device is acquired according to the identifier of the smart device bound to the login account and the identifier of the unbound smart device, and then the control interface for managing the smart device is displayed on the display interface of the terminal. Icons of the smart devices bound to the login account and icons of the unbound smart devices are displayed on the control interface for managing the smart device, as illustrated in FIG. 4B. The smart device bound to the login account includes an infrared (IR) remote control, a universal remote control, a smart camera, a bedside lamp, a television, and a smart speaker; and the unbound smart device includes a smart socket. Accordingly, the user may manage the smart device through the control interface for managing the smart device.

Optionally, the present embodiment may further include the following steps.

In step S411, a request for binding the smart device is sent to the server for managing the smart device upon detection of a binding instruction inputted from the user based on the control interface for managing the smart device. The binding instruction carries the identifier of the unbound smart device. The binding instruction is configured to trigger the binding of the relationship between the identifier of the unbound smart device and the login account. The request for binding the smart device is configured to request an establishing of the binding relationship between the login account and the identifier of the unbound smart device.

In step S412, a response for binding the smart device sent from the server for managing the smart device is received.

In step S413, the unbound smart device is displayed on the control interface for managing the smart device as a smart device bound to the login account, according to the response for binding the smart device.

Figure 4C:
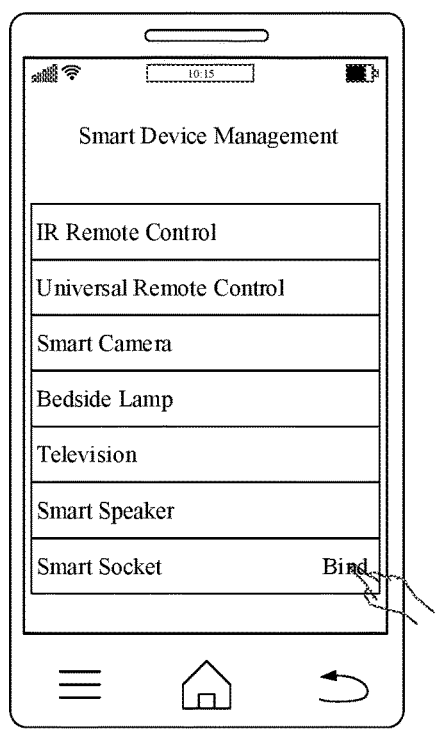
FIG. 4C is a schematic diagram illustrating an operation for controlling a smart device, according to another exemplary embodiment.
Figure 4D:
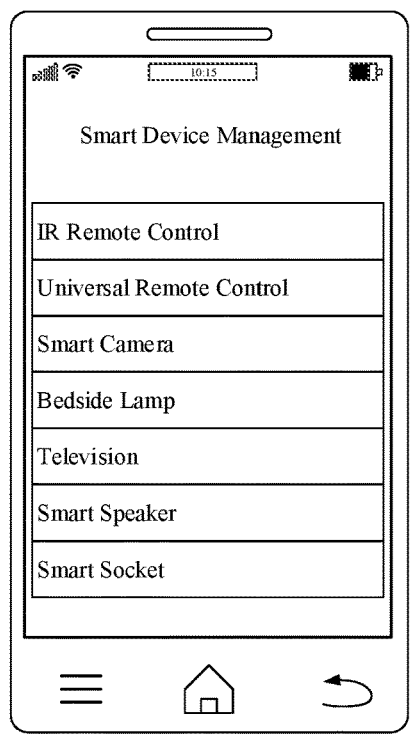
FIG. 4D is a schematic diagram illustrating a control interface for managing a smart device, according to another exemplary embodiment.

In the present embodiment, the terminal may detect the binding instruction inputted from the user by the control interface for managing the smart device, wherein the binding instruction is configured to trigger the binding of the relationship between the identifier of the unbound smart device and the login account. An icon of the unbound smart device and an icon of Bind are displayed on the control interface for managing the smart device, as illustrated in FIG. 4B. Taking the terminal including a touch screen for example, the user may tap the icon of Bind displayed on the control interface for managing the smart device corresponding to the icon of the unbound smart device, such that the terminal may acquire the binding instruction inputted from the user from the touch screen and the control interface for managing the smart device, as illustrated in FIG. 4C. Afterwards, the request for binding the smart device is sent to the server for managing the smart device, wherein the request for binding the smart device is configured to request an establishing of the binding relationship between the above login account stored in the terminal and the identifier of the unbound smart device. The server for managing the smart device establishes the binding relationship between the identifier of the unbound smart device and the login account according to the request for binding the smart device, and then sends the response for binding the smart device to the terminal to indicate that the above binding relationship has been established successfully. The terminal displays the unbound smart device on the control interface for managing the smart device as a smart device bound to the login account according to the received response for binding the smart device, as illustrated in FIG. 4D. For example, the displayed icon of Bind may be cancelled from the control interface for managing the smart device.

In step S414, the interface for controlling the target smart device is obtained upon detection of the instruction for controlling the target smart device inputted from the user based on the control interface for managing the smart device.

In step S415, the interface for controlling the target smart device is displayed.

In the present embodiment, the implementation of the steps S414-S415 may refer to corresponding description in the embodiment illustrated in FIG. 2A, which will not be elaborated herein.

To sum up, according to the method for controlling the smart device of the present embodiment, the interface for controlling the system is displayed upon detection of the instruction for controlling the system inputted from the user, then the control interface for managing the smart device is displayed upon detection of the control instruction for managing the smart device inputted from the user based on the interface for controlling the system, and then the interface for controlling the target smart device is displayed upon detection of the instruction for controlling the target smart device inputted from the user based on the control interface for managing the smart device, such that the user may enter the interface for controlling the target smart device from the interface for controlling the system and the control interface for managing the smart device successively, and then control the target smart device. Accordingly, the present disclosure may solve the problem that although smart devices can be managed according to the related art, the user has to download an application for managing the smart devices and the operation is relatively complex, thereby achieving an effect of simplifying user operation.

It should be noted that all the schemes for entering the interface for controlling the target smart device based on the interface for controlling the system fall within the scope of the technical solutions of the present disclosure. Hereinafter, another exemplary embodiment will be described according to one example.

Figure 5A:
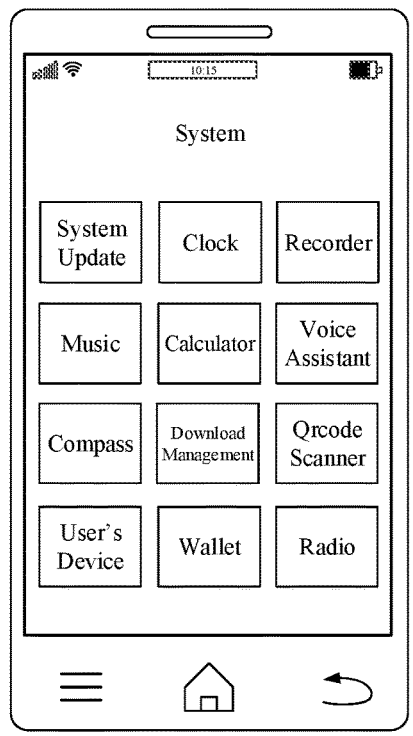
FIG. 5A is a schematic diagram illustrating an interface for controlling a system, according to another exemplary embodiment.
Figure 5B:
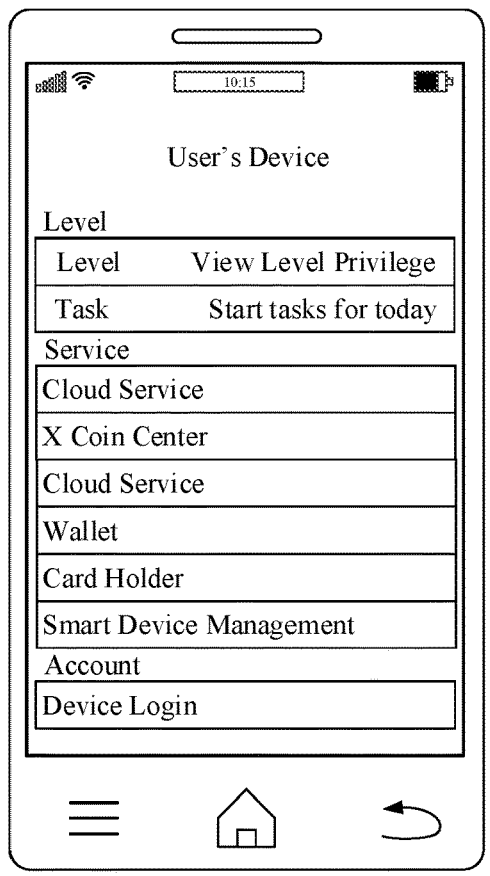
FIG. 5B is a schematic diagram illustrating an interface for controlling a user device, according to another exemplary embodiment.

In another exemplary embodiment, on the basis of the above embodiments, the present embodiment differs from the above embodiments in that: the icon of Smart Device Management is not displayed directly in the interface for controlling the system, instead, the user may enter the control interface for managing the smart device through a lower level of control interface of the interface for controlling the system. In the present embodiment, the lower level of control interface being an interface for controlling the user's device is taken for example. The interface for controlling the system according to the present embodiment is illustrated in FIG. 5A, an icon of User's Device is displayed on the interface for controlling the system. The user may tap the icon of User's Device displayed on the interface for controlling the system based on the interface for controlling the system, such that the terminal may detect an instruction for controlling the user's device inputted from the user by the touch screen and the interface for controlling the system, wherein the instruction for controlling the user's device is configured to trigger the acquiring of the interface for controlling the user's device. Afterwards, the terminal acquires and displays the interface for controlling the user's device. For example, the interface for controlling the user's device according to the present embodiment is illustrated in FIG. 5B, and the icon of Smart Device Management is displayed on the interface for controlling the user's device. The user may tap the icon of Smart Device Management displayed on the interface for controlling the user's device based on the interface for controlling the user's device, such that the terminal may detect the control instruction for managing the smart device inputted from the user by the touch screen and the interface for controlling the user's device, and then acquire and display the control interface for managing the smart device, as illustrated in FIG. 2D. The terminal may display the interface for controlling the target smart device based on the control interface for managing the smart device. Alternatively, the icon of Device Login is not displayed directly in the interface for controlling the system, instead, the user may enter the logging interface for logging in the device through a lower level of control interface of the interface for controlling the system. As illustrated in FIG. 5B, an icon of Device Login is displayed on the interface for controlling the user's device. The user may tab the icon of Device Login displayed on the interface for controlling the user's device based on the interface for controlling the user's device, such that the terminal may detect the control instruction for logging in device inputted from the user by the touch screen and the interface for controlling the user's device, and then acquire and display the logging interface for logging in the device, as illustrated in FIG. 3C.

The following is embodiments of apparatuses according to the present disclosure, which may be configured to perform the embodiments of methods of the present disclosure. Details not disclosed in the embodiments of apparatuses may be referred to the embodiments of methods.

Figure 6:
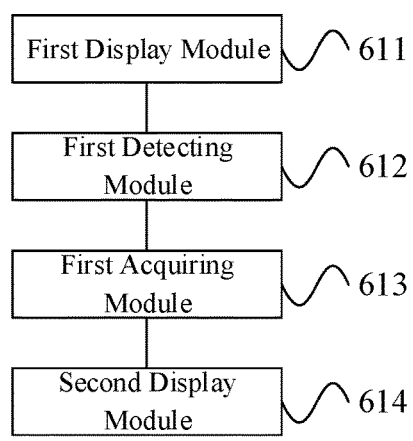
FIG. 6 is a block diagram illustrating an apparatus for controlling a smart device, according to an exemplary embodiment.

FIG. 6 is a block diagram illustrating an apparatus for controlling a smart device, according to an exemplary embodiment. The apparatus may be implemented as part or whole of a terminal by a software, a hardware or a combination of the both. As illustrated in FIG. 6, the apparatus may include: a first display module 611, a first detecting module 612, a first acquiring module 613 and a second display module 614.

The first display module 611 is configured to display an interface for controlling a system.

The first detecting module 612 is configured to detect an instruction for controlling a target smart device inputted from a user based on the interface for controlling the system.

The first acquiring module 613 is configured to acquire an interface for controlling the target smart device when the first detecting module 612 detects the instruction for controlling the target smart device inputted from a user based on the interface for controlling the system. The instruction for controlling the target smart device carries an identifier of the target smart device, and the instruction for controlling the target smart device is configured to trigger the acquiring of the interface for controlling the target smart device.

The second display module 614 is configured to display the interface for controlling the target smart device.

To sum up, according to the apparatus for controlling the smart device of the present embodiment, upon detection of the instruction for controlling the target smart device inputted from the user based on the interface for controlling the system, the interface for controlling the target smart device is acquired and then displayed, such that the user may control the target smart device based on the interface for controlling the target smart device, thereby the user may access the interface for controlling the target smart device through the interface for controlling the system and manage the target smart device. Accordingly, the present disclosure may solve the problem that although smart devices can be managed according to the related art, the user has to download an application for managing the smart devices and the operation is relatively complex, thereby achieving an effect of simplifying user operation.

Figure 7:
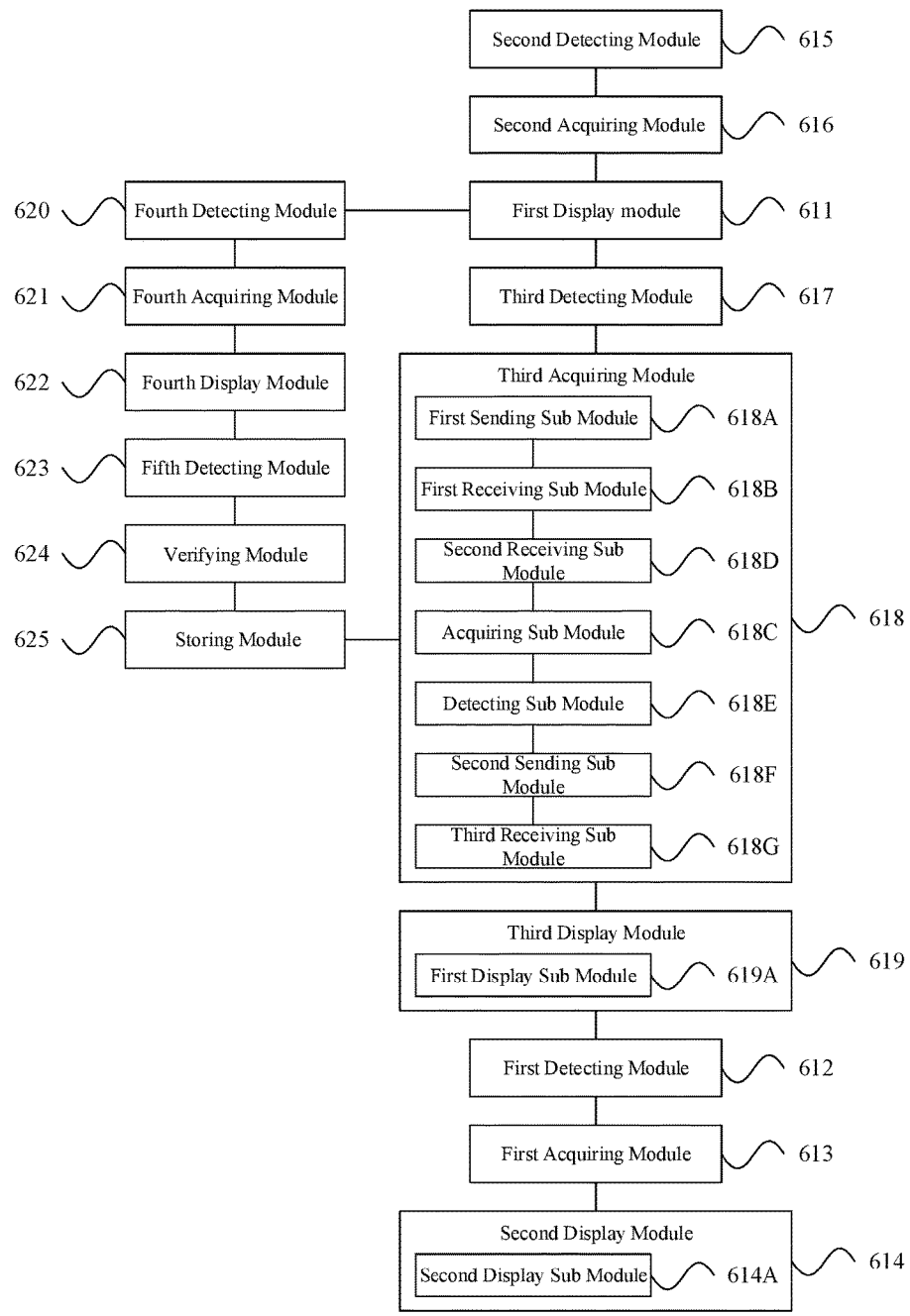
FIG. 7 is a block diagram illustrating an apparatus for controlling a smart device, according to another exemplary embodiment.

FIG. 7 is a block diagram illustrating an apparatus for controlling a smart device, according to another exemplary embodiment. The apparatus may be implemented as part or whole of a terminal by a software, a hardware or a combination of the both. As illustrated in FIG. 7, on the basis of the apparatus illustrated in FIG. 6, the apparatus may further include: a second detecting module 615 and a second acquiring module 616.

The second detecting module 615 is configured to detect an instruction for controlling the system inputted from the user.

The second acquiring module 616 is configured to acquire the interface for controlling the system when the second detecting module 615 detects the instruction for controlling the system inputted from the user. The instruction for controlling the system is configured to trigger the acquiring of the interface for controlling the system.

Optionally, the apparatus may further include a third detecting module 617, a third acquiring module 618 and a third display module 619.

The third detecting module 617 is configured to detect a control instruction for managing the smart device inputted from the user based on the interface for controlling the system.

The third acquiring module 618 is configured to acquire a control interface for managing the smart device when the third detecting module 617 detects the control instruction for managing the smart device inputted from the user based on the interface for controlling the system. The control instruction for managing the smart device is configured to trigger the acquiring of the control interface for managing the smart device.

The third display module 619 is configured to display the control interface for managing the smart device.

In one embodiment, the instruction for controlling the target smart device is inputted from the user based on the control interface for managing the smart device.

Optionally, the apparatus further includes a fourth detecting module 620, a fourth acquiring module 621, a fourth display module 622, a fifth detecting module 623, a verifying module 624 and a storing module 625.

The fourth detecting module 620 is configured to detect a control instruction for logging in the device inputted from the user based on the interface for controlling the system.

The fourth acquiring module 621 is configured to acquire a logging interface for logging in the device when the fourth detecting module 620 detects the control instruction for logging in the device inputted from the user based on the interface for controlling the system. The control instruction for logging in the device is configured to trigger the acquiring of the logging interface for logging in the device.

The fourth display module 622 is configured to display the logging interface for logging in the device.

The fifth detecting module 623 is configured to detect a login instruction inputted from the user based on the logging interface for logging in the device.

The verifying module 624 is configured to verify a login account and a login password when the fifth detecting module 623 detects the login instruction inputted from the user based on the logging interface for logging in the device. The login instruction carries the login account and the login password, and the login instruction is configured to trigger the verifying of the login account and the login password.

The storing module 625 is configured to store the login account if the login account and the login password are authenticated by the verifying module 624.

The third acquiring module 618 may include a first sending sub module 618A, a first receiving sub module 618B and an acquiring sub module 618C.

The first sending sub module 618A is configured to send, according to the control instruction for managing the smart device, a request for querying a binding relationship to a server for managing the smart device. The request for querying the binding relationship includes the login account, and the request for querying the binding relationship is configured to request an identifier of the smart device bound to the login account.

The first receiving sub module 618B is configured to receive the identifier of the smart device bound to the login account sent from the server for managing the smart device.

The acquiring sub module 618C is configured to acquire the control interface for managing the smart device according to the identifier of the smart device bound to the login account.

Optionally, the third acquiring module 618 may further include a second receiving sub module 618D.

The second receiving sub module 618D is configured to, receive an identifier of an unbound smart device in the same local area network with the terminal sent from the server for managing the smart device, after the first sending sub module 618A sends the request for querying the binding relationship to the server for managing the smart device according to the control instruction for managing the smart device.

The acquiring sub module 618C is configured to acquire the control interface for managing the smart device according to the identifier of the smart device bound to the login account and the identifier of the unbound smart device.

Optionally, the third acquiring module 618 further includes a detecting sub module 618E, a second sending sub module 618F, and a third receiving sub module 6186; and the third display module 619 includes a first display sub module 619A.

The detecting sub module 618E is configured to detect a binding instruction inputted from the user based on the control interface for managing the smart device.

The second sending sub module 618F is configured to send a request for binding the smart device to the server for managing the smart device when the detecting sub module 618E detects the binding instruction inputted from the user based on the control interface for managing the smart device. The binding instruction carries the identifier of the unbound smart device, the binding instruction is configured to trigger the binding of a relationship between the identifier of the unbound smart device and the login account, and the request for binding the smart device is configured to request an establishing of the binding relationship between the login account and the identifier of the unbound smart device.

The third receiving sub module 618G is configured to receive a response for binding the smart device sent from the server for managing the smart device.

The first display sub module 619A is configured to display the unbound smart device on the control interface for managing the smart device as a smart device bound to the login account, according to the response for binding the smart device.

Optionally, when the instruction for controlling the target smart device is carrying identifiers of a plurality of smart devices, the second display module 614 includes a second display sub module 614A.

The second display sub module 614A is configured to display interfaces for controlling the plurality of smart devices in a splitview.

To sum up, according to the apparatus for controlling the smart device of the present embodiment, upon detection of the instruction for controlling the target smart device inputted from the user based on the interface for controlling the system, the interface for controlling the target smart device is acquired and then displayed, such that the user may control the target smart device based on the interface for controlling the target smart device, thereby the user may access the interface for controlling the target smart device through the interface for controlling the system and manage the target smart device. Accordingly, the present disclosure may solve the problem that although smart devices can be managed according to the related art, the user has to download an application for managing the smart devices and the operation is relatively complex, thereby achieving an effect of simplifying user operation.

With respect to the apparatuses in the above embodiments, the specific manners for performing operations for individual modules therein have been described in detail in the embodiments regarding the methods, which will not be elaborated herein.

Figure 8:
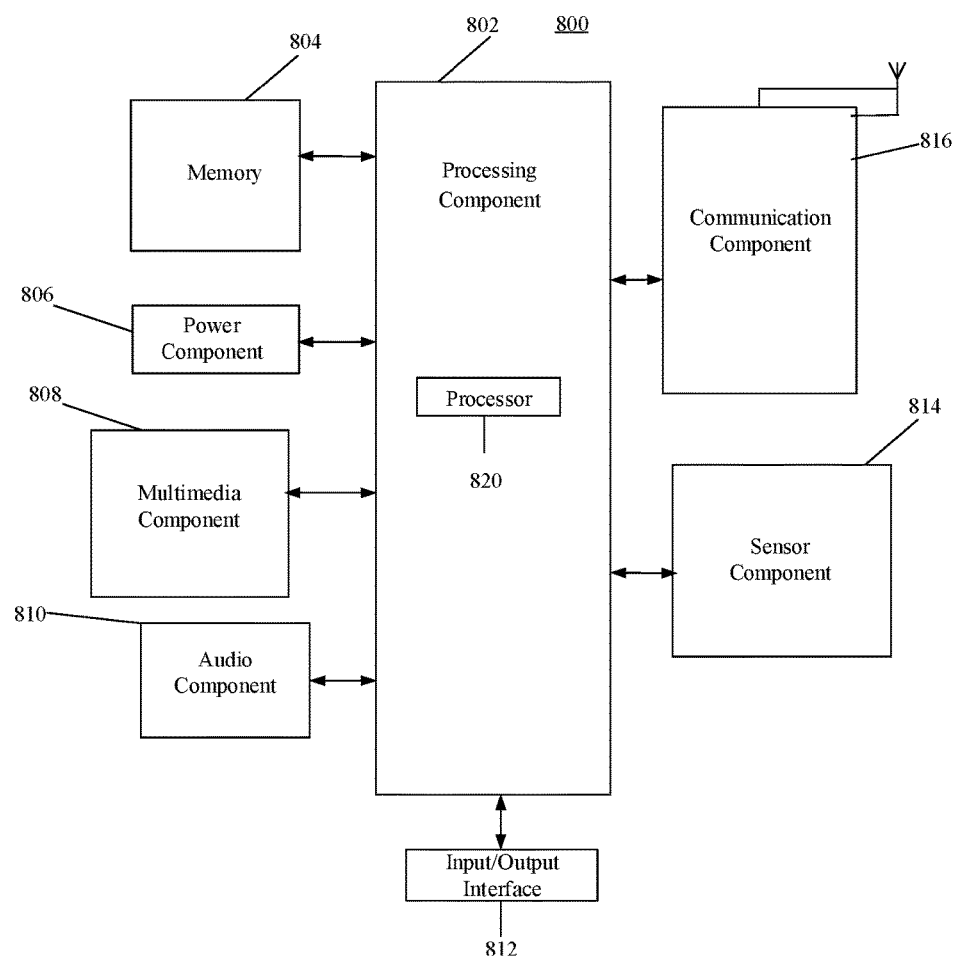
FIG. 8 is a block diagram illustrating an apparatus for controlling a smart device, according to an exemplary embodiment.

FIG. 8 is a block diagram of an apparatus 800 for controlling a smart device, according to an exemplary embodiment. For example, the apparatus 800 may be a mobile phone, a computer, a digital broadcast terminal, a messaging device, a gaming console, a tablet, a medical device, exercise equipment, a personal digital assistant, and the like.

Referring to FIG. 8, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 800 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for executing the method above. Each module, sub-module, unit, or sub-unit disclosed above may be implemented at least partially using the one or more circuitries.

In exemplary embodiments, there is also provided a non-transitory computer-readable storage medium including instructions, such as included in the memory 804, executable by the processor 820 in the apparatus 800, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium is executed by the processor of the apparatus 800, enables the apparatus 800 to perform the method for controlling the smart device provided by the above-mentioned embodiments.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method, comprising:
   displaying, by a terminal device, a first interface for controlling a system comprising the terminal device and a smart device;
   acquiring, by the terminal device, a second interface for controlling the smart device upon detection of an instruction for controlling the smart device on the first interface, the instruction for controlling the smart device comprising an identifier of the smart device, and the instruction for controlling the smart device being configured to trigger the acquiring of the second interface for controlling the smart device; and displaying, by the terminal device, the second interface for controlling the smart device; and wherein prior to acquiring the second interface for controlling the smart device, the method further comprises:

acquiring, by the terminal device, a control interface for managing the smart device upon detection of a control instruction for managing the smart device inputted from a user based on the first interface for controlling the system, the control instruction for managing the smart device being configured to trigger the acquiring of the control interface for managing the smart device; and displaying, by the terminal device, the control interface for managing the smart device, wherein the instruction for controlling the smart device is inputted from the user based on the control interface for managing the smart device; and wherein after displaying the first interface for controlling the system, the method further comprises:

acquiring, by the terminal device, a logging interface for logging in the device upon detection of a control instruction for logging in the device inputted from the user based on the interface for controlling the system, the control instruction for logging in the device being configured to trigger the acquiring of the logging interface for logging in the device;

displaying the logging interface for logging in the device;

verifying a login account and a login password upon detection of a login instruction inputted from the user based on the logging interface for logging in the device, the login instruction carrying the login account and the login password, and the login instruction being configured to trigger the verifying of the login account and the login password;

storing the login account when the login account and the login password are authenticated by the verifying, wherein acquiring the second interface for controlling the smart device comprises:

sending, according to the control instruction for managing the smart device, a request for querying a binding relationship to a server for managing the smart device, the request for querying the binding relationship comprising the login account, and the request for querying the binding relationship being configured to request an identifier of the smart device bound to the login account;

receiving the identifier of the smart device bound to the login account sent from the server for managing the smart device; and acquiring the control interface for managing the smart device according to the identifier of the smart device bound to the login account.

2. The method according to claim 1, wherein prior to displaying the first interface for controlling the system, the method further comprises:

acquiring, by the terminal device, the first interface for controlling the system upon detection of an instruction for controlling the system inputted from a user, the instruction for controlling the system being configured to trigger the acquiring of the first interface for controlling the system.

3. The method according to claim 1, wherein after sending the request for querying the binding relationship to the server for managing the smart device according to the control instruction for managing the smart device, the method further comprises:

receiving an identifier of an unbound smart device sent from the server for managing the smart device, the unbound smart device being in the same local area network with a terminal, wherein acquiring the control interface for managing the smart device comprises: acquiring the control interface for managing the smart device according to the identifier of the smart device bound to the login account and the identifier of the unbound smart device.

4. The method according to claim 3, wherein after displaying the control interface for managing the smart device, the method further comprises:

sending a request for binding the smart device to the server for managing the smart device upon detection of a binding instruction inputted from the user based on the control interface for managing the smart device, the binding instruction carrying the identifier of the unbound smart device, the binding instruction being configured to trigger the binding of a relationship between the identifier of the unbound smart device and the login account, and the request for binding the smart device being configured to request an establishing of the binding relationship between the login account and the identifier of the unbound smart device;

receiving a response for binding the smart device sent from the server for managing the smart device; and displaying the unbound smart device on the control interface for managing the smart device as a smart device bound to the login account, according to the response for binding the smart device.

5. The method according to claim 1, wherein when the instruction for controlling the smart device is carrying identifiers of a plurality of smart devices, displaying the second interface for controlling the smart device comprises: displaying interfaces for controlling the plurality of smart devices in a splitview.

6. An apparatus, comprising:

a processor; and a memory for storing instructions executable by the processor;

wherein the processor is configured to perform:

displaying an interface for controlling a system;

acquiring an interface for controlling a smart device upon detection of an instruction for controlling the smart device inputted from a user based on the interface for controlling the system, the instruction for controlling the smart device carrying an identifier of the smart device, and the instruction for controlling the smart device being configured to trigger the acquiring of the interface for controlling the smart device; and displaying the interface for controlling the smart device; and wherein the processor is further configured to perform, prior to acquiring the interface for controlling the smart device:

acquiring a control interface for managing the smart device upon detection of a control instruction for managing the smart device inputted from the user based on the interface for controlling the system, the control instruction for managing the smart device being configured to trigger the acquiring of the control interface for managing the smart device; and displaying the control interface for managing the smart device, wherein the instruction for controlling the smart device is inputted from the user based on the control interface for managing the smart device; and wherein the processor is further configured to perform, after displaying the interface for controlling the system:
acquiring a logging interface for logging in the device upon detection of a control instruction for logging in the device inputted from the user based on the interface for controlling the system, the control instruction for logging in the device being configured to trigger the acquiring of the logging interface for logging in the device;
displaying the logging interface for logging in the device;
verifying a login account and a login password upon detection of a login instruction inputted from the user based on the logging interface for logging in the device, the login instruction carrying the login account and the login password, and the login instruction being configured to trigger the verifying of the login account and the login password; and
storing the login account when the login account and the login password are authenticated by the verifying,
wherein acquiring the interface for controlling the smart device comprises:
sending, according to the control instruction for managing the smart device, a request for querying a binding relationship to a server for managing the smart device, the request for querying the binding relationship comprising the login account, and the request for querying the binding relationship being configured to request an identifier of the smart device bound to the login account;
receiving the identifier of the smart device bound to the login account sent from the server for managing the smart device; and
acquiring the control interface for managing the smart device according to the identifier of the smart device bound to the login account.

7. The apparatus according to claim 6, wherein the processor is further configured to perform, prior to displaying the interface for controlling the system:
acquiring the interface for controlling the system upon detection of an instruction for controlling the system inputted from the user, the instruction for controlling the system being configured to trigger the acquiring of the interface for controlling the system.

8. The apparatus according to claim 6, wherein the processor is further configured to perform, after sending the request for querying the binding relationship to the server for managing the smart device according to the control instruction for managing the smart device:
receiving an identifier of an unbound smart device sent from the server for managing the smart device, the unbound smart device being in the same local area network with a terminal,
wherein the acquiring a control interface for managing the smart device comprises:
acquiring the control interface for managing the smart device according to the identifier of the smart device bound to the login account and the identifier of the unbound smart device.

9. The apparatus according to claim 8, wherein the processor is further configured to perform, after displaying the control interface for managing the smart device:
sending a request for binding the smart device to the server for managing the smart device upon detection of a binding instruction inputted from the user based on the control interface for managing the smart device, the binding instruction carrying the identifier of the unbound smart device, the binding instruction being configured to trigger the binding of a relationship between the identifier of the unbound smart device and the login account, and the request for binding the smart device being configured to request an establishing of the binding relationship between the login account and the identifier of the unbound smart device;
receiving a response for binding the smart device sent from the server for managing the smart device; and
displaying the unbound smart device on the control interface for managing the smart device as a smart device bound to the login account, according to the response for binding the smart device.

10. The apparatus according to claim 6, wherein when the instruction for controlling the smart device is carrying identifiers of a plurality of smart devices, displaying the interface for controlling the smart device comprises:
displaying interfaces for controlling the plurality of smart devices in a splitview.

11. A non-transitory computer readable storage medium storing instructions, executable by a processor to perform acts comprising:
displaying an interface for controlling a system;
acquiring an interface for controlling a smart device upon detection of an instruction for controlling the smart device inputted from a user based on the interface for controlling the system, the instruction for controlling the smart device carrying an identifier of the smart device, and the instruction for controlling the smart device being configured to trigger the acquiring of the interface for controlling the smart device; and
displaying the interface for controlling the smart device; and
wherein acquiring the interface for controlling the smart device comprises:
sending, according to the control instruction for managing the smart device, a request for querying a binding relationship to a server for managing the smart device, the request for querying the binding relationship comprising the login account, and the request for querying the binding relationship being configured to request an identifier of the smart device bound to the login account;
receiving the identifier of the smart device bound to the login account sent from the server for managing the smart device; and
acquiring the control interface for managing the smart device according to the identifier of the smart device bound to the login account.

12. The non-transitory computer readable storage medium of claim 11, wherein the acts further comprise:
displaying a control interface for managing a plurality of smart devices; and
displaying interfaces for controlling at least two of the plurality of smart devices in a splitview when the instruction includes the at least two identifiers of the plurality of smart devices.

13. The non-transitory computer readable storage medium of claim 11, wherein the acts further comprise:
acquiring the interface for controlling the system upon detection of an instruction for controlling the system inputted from the user, the instruction for controlling the system being configured to trigger the acquiring of the interface for controlling the system.

14. The non-transitory computer readable storage medium of claim 11, wherein the acts further comprise:
acquiring a control interface for managing the smart device upon detection of a control instruction for managing the smart device inputted from the user based on the interface for controlling the system, the control instruction for managing the smart device being configured to trigger the acquiring of the control interface for managing the smart device; and displaying the control interface for managing the smart device.

15. The non-transitory computer readable storage medium of claim 14, wherein the acts further comprise:

acquiring a logging interface for logging in the device upon detection of a control instruction for logging in the device inputted from the user based on the interface for controlling the system, the control instruction for logging in the device being configured to trigger the acquiring of the logging interface for logging in the device;

displaying the logging interface for logging in the device;

verifying a login account and a login password upon detection of a login instruction inputted from the user based on the logging interface for logging in the device, the login instruction carrying the login account and the login password, and the login instruction being configured to trigger the verifying of the login account and the login password; and storing the login account when the login account and the login password are authenticated by the verifying.

* * * * *